Patented June 13, 1950

2,511,605

UNITED STATES PATENT OFFICE 2,511,605

PREPARATION OF CHLORINATED POLYMERS

John S. Tinsley and Paul Burke Welldon, Wilmington, Del., assignors to Hercules Powder Company, Wilmington, Del., a corporation of Delaware No Drawing. Application July 23, 1946, Serial No. 685,782

11 Claims. (Cl. 260—83.3)

This invention relates to a process for the preparation of chlorinated butadiene polymers and, more particularly, relates to a process for the preparation of chlorinated butadiene rubbers having good color and solubility in organic solvents.

It is known that the chlorination of natural rubber, which is generally performed in the presence of a solvent such as carbon tetrachloride, results in the formation of a product which is an excellent raw material for the preparation of lacquers and coatings. Also, butadiene polymers, such as polymeric butadienes-1,3, and copolymers of butadiene-1,3 with other substances such as acrylonitrile and styrene have been subjected to chlorination. The chlorination products thus obtained have differed from chlorinated natural rubber in a number of respects. As a rule, dark products, gelatinous when dispersed in solvents, have been obtained. Their poor solubility properties make them unsuitable for most coating applications. Attempts to improve solubility have not led to acceptacle products. One expedient for improving solution properties has been to chlorinate at high temperatures. Improvement in solubility is obtained but high temperature gives products which are degraded, unstable, and colored. Another method has involved degrading the solid butadiene rubbers as supplied by extensive milling to break down gel-forming molecular aggregates. This process is unsatisfactory, since it necessitates expensive milling equipment and calls for long treatment at high power consumption; the result is a colored product which is frequently darker than an unmilled product. No method has been known for preparing products of good color and of good solubility.

Now, in accordance with this invention, it has been found that chlorinated butadiene polymers (including butadiene copolymers) having excellent color, solubility, and viscosity may be obtained by a method which starts with the latex, formed by emulsion polymerization of a butadiene alone or of a butadiene with copolymerizable materials leading to elastomeric polymer and containing the usual emulsifier. The method comprises coagulating the polymer from the latex, washing the polymer until water-soluble material such as the emulsifying agent is substantially eliminated, then dissolving the purified but wet polymer in a chlorination solvent, removing water present as such, and then chlorinating the resulting solution. It is important that the usual step of drying the coagulated polymer is omitted.

The method of this invention is an advance over the prior art in that the product has greatly improved solubility and color. Milling is avoided.

The following examples are illustrative of the process which comprises this invention; comparator examples show the advance achieved.

EXAMPLE 1

A GR-S latex (150 grams) containing 27% of a 75:25 butadiene-styrene copolymer and obtained by the usual emulsion polymerization was treated with saturated sodium chloride solution to bring about coagulation. The coagulated polymer so obtained was washed with concentrated sodium chloride solution, then with progressively more dilute salt solutions, and finally with pure water until all or substantially all of the emulsifying agent present in the original latex and all salt had been removed. The damp, coagulated polymer so obtained was dissolved in 910 grams of 1,1,2-trichloroethane. The resulting solution was freed of water by partial distillation at 35 mm. absolute pressure. The clear, light-colored, dry solution so obtained was diluted with additional trichloroethane to a total weight of 1250 grams (giving a solution containing 3.2% polymer), then subjected to chlorination at 77–86° C. for a period of 5 hours at atmospheric pressure. Chlorine was introduced at a rate of 36 grams per hour during the first 2½ hours and 29 grams per hour thereafter. During the last 2½ hours, air was introduced at the rate of 1 cc. per second. No formation of insoluble intermediates or gelling took place during the reaction.

The chlorinated product was precipitated by slow addition of the final solution to methanol with vigorous stirring. The product was dried in a vacuum oven at 70° C. for 24 hours. It was a white solid containing 50.1% chlorine; it was soluble in benzene, toluene, methyl ethyl ketone, ethyl acetate, butyl acetate, and dioxane. A 20% solution of the product in toluene had a viscosity of 473 centipoises as measured in a horizontal capillary viscometer at 25° C.

Comparator example

The following preparation is included for comparison with the method of the invention as illustrated by Example 1:

GR-S rubber in the form of the usual brown, rubbery lumps of 75:25 butadiene-styrene copolymer was milled on a two-roll mill for 5¼ hours at 20–80° C. The milled product was dissolved in 1,1,2-trichloroethane to form a 3.3% solution of total weight of 3680 grams. The solution was chlorinated at 70–85° C. for 28 hours at a rate of 31 grams of chlorine per hour for the first 13 hours and 17 grams per hour thereafter. The chlorination mixture was badly gelled after 2 hours of chlorination although a solution eventually formed. During the last 15 hours, air was introduced at a rate of 1 cc. per second. The resulting chlorinated product, which was in the form of an extremely viscous solution in the trichloroethane, was precipitated in vigorously stirred methanol and dried at 70° C. for 24 hours in a vacuum oven.

The product was tan in color and contained 51.0% chlorine. Satisfactory solutions thereof could not be formed in toluene or methyl ethyl ketone, due to gelling. Standard viscosity measurements in toluene could not be made because of this gelling characteristic.

EXAMPLE 2

Hycar O. S. 10 latex, obtained by the usual emulsion polymerization and containing 37% 50:50 butadiene-styrene copolymer, was treated with a 20% sodium chloride solution in order to coagulate the polymer. The coagulated polymer was washed with progressively more dilute salt solutions and finally with water until emulsifying agents and salt were eliminated. The wet, purified polymer was dissolved in carbon tetrachloride from which water was removed by partial distillation. Additional carbon tetrachloride was added to give a substantially anhydrous solution 1.5% polymer. The solution (containing 45 grams of polymer) was subjected to chlorination by the addition of chlorine at a rate of 25 grams per hour. Chlorination was conducted for 6 hours at 70–75° C. and then for an additional period of 4 hours while the chlorine rate was 15 grams per hour. The entire reaction was carried out in the presence of ultra-violet light. The resulting chlorinated product was precipitated by pouring into hot water with vigorous stirring and was dried at 70° C. in vacuum for 24 hours.

The white product contained 44.9% chlorine and was soluble in toluene, methyl ethyl ketone, butyl acetate, and high-boiling petroleum hydrocarbon fractions; it had a viscosity of 105 centipoises in 20% solution of toluene when measured in a horizontal capillary viscometer at 25° C.

Comparator example

This preparation, following a usual method of chlorination, is included for comparison with the method of the invention as shown by Example 2.

Commercial Hycar O. S. 10 (50:50 butadiene-styrene), in the usual solid, rubbery form, was agitated with carbon tetrachloride. Solutions could not be formed due to heavy gel formation. It was found necessary to mill the synthetic rubber to solubilize it; this was done on a cold two-roll mill for 2½ hours prior to putting it into solution. A 1.5% solution of 45 grams of the milled material in carbon tetrachloride was chlorinated for 41 hours at 70–75° C. in the presence of ultraviolet light. During this period, chlorine was added at a rate of 25 grams per hour. The product was precipitated by gradual addition of the solution to hot water with vigorous stirring and dried at 70° C. in vacuum for 24 hours.

The light brown product obtained contained 45.3% chlorine. Standard viscosity measurements in toluene were impossible because of gelling. Satisfactory solutions could not be formed in toluene or methyl ethyl ketone due to heavy gelling.

EXAMPLE 3

Polyisoprene latex, obtained by emulsion polymerization of isoprene, was treated with a 20% sodium chloride solution in order to coagulate the polymer. The precipitate was washed with progressively more dilute salt solutions and finally with water. The wet, purified polymer was dissolved in carbon tetrachloride; the excess water was removed by partial distillation. The solids content was adjusted to 3.2%, and the solution (containing 32 grams of polymer) was subjected to chlorination by the addition of chlorine at a rate of 25 grams per hour. Chlorination was conducted for 5 hours at 70–75° C. in the presence of ultraviolet light. The chlorinated product was precipitated by addition of the final carbon tetrachloride solution to hot water with stirring and was dried for 24 hours at 70° C. in vacuo.

The white solid product contained 67.3% chlorine and was soluble in benzene, toluene, methyl ethyl ketone, ethyl acetate, butyl acetate, and dioxane. A 20% solution of the product in toluene had a viscosity of 44 centipoises when measured in a horizontal capillary viscometer at 25° C.

Comparator example

This preparation is included for comparison with the method of the invention as shown in Example 3.

Commercial polyisoprene in solid, rubbery form was agitated with carbon tetrachloride; solutions could not be formed due to heavy gel formation. A 125-gram sample of the solid polyisoprene was milled for 45 minutes on a two-roll mill at 65° C. Heavy gel formation resulted when the milled polymer was agitated overnight with carbon tetrachloride. Two hundred grams of polyisoprene was milled for 2 hours at 120° C. on a two-roll mill. A brown-colored 3.2% solution of the milled polymer in carbon tetrachloride could now be prepared. This solution (containing 32 grams of polymer) was subjected to chlorination by the addition of chlorine at a rate of 25 grams per hour, over a period of 16 hours, at 70–75° C., in the presence of ultraviolet light. The product was precipitated by gradual addition of the solution to hot water with vigorous stirring and dried for 24 hours at 70° C. in vacuo.

The light brown product contained 65.1% chlorine. Satisfactory solutions thereof could not be formed in toluene or methyl ethyl ketone, due to gelling. Standard viscosity measurements in toluene could not be made because of this gelling characteristic.

The table, given below, presents a comparison between the products obtained by the process of the invention and the products obtained by the prior art method:

TABLE

| Example | Method | Chlorination Time, Hours | Percent Chlorine | Cp. Viscosity | Color | Nature of Solution |
|---|---|---|---|---|---|---|
| 1 | Solution from undried, purified, coagulated polymer | 5 | 50.1 | 473 | White | Smooth |
|   | Solution from milled solid | 28 | 51.0 |  | Tan | Gelled |
| 2 | Solution from undried, purified, coagulated polymer | 10 | 44.9 | 105 | White | Smooth |
|   | Solution from milled solid | 41 | 45.3 |  | Light Brown | Gelled |
| 3 | Solution from undried, coagulated polymer | 5 | 67.3 | 44 | White | Smooth |
|   | Solution from milled solid | 16 | 65.1 |  | Light Brown | Gelled |

The process of this invention may be used to advantage in the preparation of chlorinated polymers of the elastomeric type, in general, where formed by the emulsion polymerization process—for example, polymers of unsubstituted butadiene, substituted butadienes, copolymers of butadiene and other polymerizable substances leading to elastomeric polymers, and similar copolymers of substituted butadienes and other polymerizable substances. These include polymers of butadiene-1,3, of isoprene (2-methyl butadiene-1,3), of 2,3-dimethyl butadiene-1,3, polymers of substituted butadienes such as neoprene (polymer of 2-chloro-butadiene-1,3), Euna-S-type rubbers, such as GR-S (75:25 butadiene-styrene copolymer) and Hycar O. S. 10 (50:50 butadiene-styrene copolymer), and copolymers of butadienes with such polymerizable materials as styrene, acrylonitrile and acrylic esters, and similar elastomeric; i. e., more or less rubbery, polymers prepared from polymerizable monomers comprising at least about 35% of a butadiene capable of polymerizing to an elastomer; i. e., at least 35% of a compound of the formula

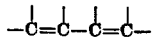

Such polymers will be referred to hereinafter and in the claims as butadiene polymers and it will be understood that elastomers derived wholly or in part (above about 35%) from butadiene, unsubstituted or as a polymerizable substituted butadiene, are meant. The term "a butadiene" will refer to polymerizable substituted butadienes as well as simple butadiene. The process applies to such polymers and copolymers when they are available in latex form, having been polymerized by an emulsion process to a structure such that, upon coagulation, an elastomeric mass is produced.

The preparation of these synthetic rubbers by emulsion processes requires the use of emulsifying agents. Such agents are usually water-soluble or water-dispersible. They include alkali-metal soaps of higher fatty acids, such as the sodium salts of oleic, linoleic, and stearic acids; alkali-metal salts of sulfonic acid derivatives, for example, the sodium salt of dibutyl naphthalene sulfonic acid; alkali-metal salts of rosin and rosin derivatives; certain tetra-substituted ammonia salts, such as lauryl pyridinium chloride; sodium salts of long chain alcohol sulfates, such as sodium lauryl sulfate; and the like.

A feature of this invention is the substantial removal of these emulsifying agents prior to chlorination by washing the polymers after their coagulation from the latex resulting from the emulsion polymerization. This is done without isolation of the polymer in a dry, solidified state resembling natural rubber. Likewise, other water-dispersible elements required in emulsion polymerization, such as the usual mercaptan reaction modifier, may be eliminated; also, antioxidants, which are damaging to color, are not present in the chlorination solution.

When rubberlike, solid synthetic rubbers are received from the polymer manufacturer, they are usually in the form of lumps or rough, thick sheets having a color which varies from brown to very dark brown. While the exact nature of this coloring material is uncertain, it appears to have been produced from the emulsifying agent, from the antioxidant which is essential when the polymer is dried, and from the heat-treatment of the synthetic rubber received during drying. Probably, there are also molecular changes inherent in drying and storage as a solid.

If the latex is employed as in the present process, instead of using solidified rubber material, one of the sources of undesirable color products formed in drying and storage is completely eliminated. The latex formed by the emulsion polymerization process is a milky fluid comprising water, the emulsified polymer, emulsifying agent, and usually catalyst, modifier, and antioxidant. The various additives appear to cause color upon chlorination. Molecular differences between polymer in latex or undried coagulant and in dried polymer also cause, by unknown mechanism, color formation and gelation. Long chlorination, necessary where gelling occurs, leads to degraded fractions and molecular inhomogeneity.

According to the present invention, the first step in the new process comprises coagulation of the polymer from the latex formed during emulsion polymerization by the addition to the latex of coagulants. Alum and sodium chloride, potassium sulfate, barium chloride, calcium chloride, aluminum chloride, and similar materials are suitable for this purpose; concentrated solutions of sodium chloride are preferred coagulants. Other coagulants may be used. However, acids are undesirable in cases where the emulsifier present is a soap or salt reactive with an acid to form a water-insoluble product, since such a product will remain with the polymer.

When using sodium chloride solutions as coagulants, it is preferred that the concentration thereof be from about 10% to about 20% sodium chloride. If more dilute solutions are employed, complete coagulation may not be effected. The aqueous layer produced contains not only salt but a large part of the emulsifying agent and other water-soluble adjuvants of polymer formation. It is usually dark in color. The coagulated material is substantially colorless.

As pointed out hereinbefore, an essential feature of this invention is the virtually complete removal of emulsifying agent from the coagulated material. This is effected by washing the material with progressively more dilute salt solutions and finally with water. Washes with salt solution prevent reemulsification prior to substantial elimination of emulsifier. The final pure water wash may be omitted, if desired, the product to be chlorinated containing small amounts of salt which usually do not interfere in the chlorination reaction and which may be removed subsequently. Preferably, however, a pure water wash is used after substantially all the emulsifying agent has been removed.

After the emulsifying agent has been removed from the coagulated butadiene rubber by washing, the purified synthetic rubber is dissolved in the chlorination solvent. The solvents used in the chlorination of butadiene polymers are those which do not chlorinate readily and which are solvents for both the polymer and the chlorinated product. They should be of relatively low boiling point so that they may be removed by distillation or flashing after chlorination or are otherwise easily removable. Suitable solvents include methylene chloride, chloroform, carbon tetrachloride, symmetrical dichloroethane, 1,1,2-trichloroethane, 1,1,1-trichloroethane, symmetrical tetrachloroethane, benzene, chlorobenzene, trichlorobenzene, and nitrobenzene. The preferred chlorination solvents are carbon tetrachloride and 1,1,2-trichloroethane.

The purified butadiene rubber obtained from latex is not permitted to dry before dissolving but is mixed with the solvent while still wet from the washing step. This is done by stirring or agitating the purified polymer with the chlorination solvent. The nature of the coagulated synthetic rubber is such that only about 25% or less of the wet product is water, the remainder being the butadiene polymer. When the wet rubber is dissolved in the chlorination solvent, this relatively small amount of water is easily removed.

After the wet butadiene polymer is dissolved in the chlorination solvent, excess; i. e., free undissolved water, is substantially removed, or the solution may be dehydrated entirely. This may be accomplished by dehydrating agents, such as anhydrous calcium sulfate or anhydrous calcium chloride, or by partial distillation. The latter method is preferred. By partial distillation of the solution, which may be at reduced pressure as in the case of high-boiling solvents, part of the solvent and substantially all of the water are removed, leaving a practically colorless solution of the polymer containing none of the emulsifying agent used during the polymerization and having a viscosity suitable for uniform chlorination and subsequent precipitation.

The concentration of the chlorination solution is not a critical factor in carrying out the present invention. Ordinarily, the concentration of the synthetic rubber in the solution varies from about 0.5% to about 20% and preferably is from about 1% to about 5%.

Chlorination is carried out by bubbling chlorine through the solution, usually while the solution is at an elevated temperature. Oxidation may be conducted during or subsequent to chlorination in order to lower and regulate the viscosity of the product as desired. Preferably, air is the oxidizing agent employed, and the oxidation is preferably conducted concurrently with the latter part of the chlorination. The use of ultraviolet light during chlorination is optional if a suitably inert solvent is employed.

The temperature at which the chlorination is conducted does not constitute a critical feature of this invention but usually is from about 60° C. to about 113° C. and preferably is from about 75° C. to about 85° C.

After chlorination and viscosity reduction have been completed, the product may be recovered from solution by any of the usual methods. Usually, it is precipitated by introducing the chlorinated product into hot water, preferably just below the boiling point, or in other precipitants such as methanol. Hydrochloric acid and unreacted chlorine are removed by water washing. The water or other precipitant may contain an alkaline substance to neutralize acids formed during chlorination. Preferably, the solution of the chlorinated butadiene polymer is introduced below the surface of agitated boiling water in a fine stream in order to allow substantially complete evaporation of the solvent by the time the chlorinated product reaches the surface of the precipitating bath. Atomizing devices are used if very finely-divided particles of the product are desired. Steam is the preferred atomizing agent, since this not only provides for satisfactory dispersal of the solution but maintains the precipitating bath at an elevated temperature. The precipitated product is preferably centrifuged to remove the bulk of precipitant, after which it is dried, preferably in a vacuum oven at about 70° C., and then crushed to the desired granule size.

The exact cause of high viscosity and poor solubility of dried, solidified synthetic rubbers and of the chlorinated products prepared therefrom has not been ascertained. It appears to be due, at least in part, to cross-linkages which occur when synthetic polymers are dried in the presence of heat for prolonged periods, such as normally occur during processing of the polymer by a synthetic rubber manufacturer.

The products obtained by the process of the present invention have chlorine contents up to about 70%; i. e., 40–70%, and viscosities which range from about 2 cps. to about 500 cps. when measured in 20% toluene solution in a horizontal capillary viscometer at 25° C. The products made according to this invention are not only capable of forming solutions of suitable viscosities, but are soluble in a wide range of solvents including benzene, toluene, methyl ethyl ketone, ethyl acetate, butyl acetate, and dioxane without creating gelled structures. The products of the invention have excellent color, normally being white, while those prepared from milled synthetic rubbers previously solidified and dried are usually tan or brown.

What we claim and desire to protect by Letters Patent is:

1. A process for preparing chlorinated butadiene polymers low in color and freely soluble in organic solvents which comprises coagulating synthetic rubbery polymer from a latex formed by emulsion polymerization of a material selected from the group consisting of conjugate diolefin hydrocarbons, halogen-substituted conjugate diolefin hydrocarbons, and mixtures of a material selected from the group consisting of styrene, acrylonitrile, and acrylic esters with a material selected from the group consisting of conjugate diolefin hydrocarbons and halogen-substituted conjugate diolefin hydrocarbons in the presence of an emulsifying agent, washing out substantially all of the water-soluble material present, dissolving the resulting wet, purified polymer in a chlorination solvent, separating water from the resulting solution, chlorinating the polymer in the resulting solution, and recovering a freely soluble chlorinated product.

2. A process for preparing chlorinated polyisoprene polymers low in color and freely soluble in organic solvents which comprises coagulating synthetic rubbery polymer from a latex formed by emulsion polymerization of isoprene in the presence of an emulsifying agent, washing out substantially all of the water-soluble material present, dissolving the wet, purified polymer in a chlorination solvent, separating water from the resulting solution, chlorinating the polymer in the resulting solution, and recovering a freely soluble chlorinated product.

3. A process for preparing chlorinated butadiene polymers soluble in organic solvents and low in color which comprises coagulating synthetic rubbery polymer from a latex formed by emulsion polymerization of a mixture of butadiene-1,3 and styrene in the presence of an emulsifying agent, washing out substantially all of the water-soluble material present, dissolving the resulting wet, purified polymer in a chlorination solvent, separating excess water from the solution, chlorinating the polymer in the resulting solution, and recovering a freely soluble chlorinated product.

4. A process for preparing chlorinated butadiene polymers low in color and freely soluble in organic solvents which comprises coagulating synthetic rubbery polymer from a latex formed by emulsion polymerization of a material selected from the group consisting of conjugate diolefin hydrocarbons, halogen-substituted conjugate diolefin hydrocarbons, and mixtures of a material selected from the group consisting of styrene, acrylonitrile, and acrylic esters with a material selected from the group consisting of conjugate diolefin hydrocarbons and halogen-substituted conjugate diolefin hydrocarbons in the presence of an emulsifying agent by treating the latex with a salt solution sufficiently concentrated to cause precipitation, washing the coagulated polymer with decreasingly concentrated salt solution and finally with water alone to remove water-soluble components of the latex, dissolving the resulting wet, purified polymer in a chlorination solvent, separating water from the resulting solution, chlorinating the polymer in the resulting solution, and recovering a freely soluble chlorinated product.

5. A process for preparing chlorinated butadiene polymers low in color and freely soluble in organic solvents which comprises coagulating synthetic rubbery polymer from a latex formed by emulsion polymerization of a material selected from the group consisting of conjugate diolefin hydrocarbons, halogen-substituted conjugate diolefin hydrocarbons, and mixtures of a material selected from the group consisting of styrene, acrylonitrile, and acrylic esters with a material selected from the group consisting of conjugate diolefin hydrocarbons and halogen-substituted conjugate diolefin hydrocarbons in the presence of an emulsifying agent by treating the latex with a salt solution sufficiently concentrated to cause precipitation, washing the coagulated polymer with decreasingly concentrated salt solution and finally with water alone to remove water-soluble components of the latex, dissolving the resulting wet, purified polymer in a chlorination solvent, dehydrating the solution so formed by distilling out water present, chlorinating the polymer in the resulting solution, and recovering a freely soluble chlorinated product.

6. A process for preparing chlorinated polyisoprene polymers low in color and freely soluble in organic solvents which comprises coagulating synthetic rubbery polymer from a latex formed by emulsion polymerization of isoprene in the presence of an emulsifying agent, washing out substantially all of the water-soluble material present, dissolving the resulting wet, purified polymer in a chlorination solvent, dehydrating the solution so formed by distilling out water present, chlorinating the polymer in the resulting solution, and recovering a freely soluble chlorinated product.

7. A process for preparing chlorinated butadiene polymers soluble in organic solvents and low in color which comprises coagulating synthetic rubbery polymer from a latex formed by emulsion polymerization of a mixture of butadiene-1,3 and styrene in the presence of an emulsifying agent, washing out substantially all of the water-soluble material present, dissolving the resulting wet, purified polymer in a chlorination solvent, dehydrating the solution so formed by distilling out water present, chlorinating the polymer in the resulting solution, and recovering a freely soluble chlorinated product.

8. A process for preparing chlorinated polyisoprene polymers low in color and freely soluble in organic solvents which comprises coagulating synthetic rubbery polymer from a latex formed by emulsion polymerization of isoprene in the presence of an emulsifying agent, washing out substantially all of the water-soluble material present, dissolving the wet, purified polymer in carbon tetrachloride, separating water from the resulting solution, chlorinating the polymer in the resulting solution, and recovering a freely soluble chlorinated product.

9. A process for preparing chlorinated polyisoprene polymers low in color and freely soluble in organic solvents which comprises coagulating synthetic rubbery polymer from a latex formed by emulsion polymerization of isoprene in the presence of an emulsifying agent, washing out substantially all of the water-soluble material present, dissolving the resulting wet, purified polymer in carbon tetrachloride, dehydrating the solution so formed by distilling out water present, chlorinating the polymer in the resulting solution, and recovering a freely soluble chlorinated product.

10. A process for preparing chlorinated butadiene polymers soluble in organic solvents and low in color which comprises coagulating synthetic rubbery polymer from a latex formed by emulsion polymerization of a mixture of butadiene-1,3 and styrene in the presence of an emulsifying agent, washing out substantially all of the water-soluble material present, dissolving the resulting wet, purified polymer in 1,1,2-trichloroethane, separating excess water from the solution, chlorinating the polymer in the resulting solution, and recovering a freely soluble chlorinated product.

11. A process for preparing chlorinated butadiene polymers soluble in organic solvents and low in color which comprises coagulating synthetic rubbery polymer from a latex formed by emulsion polymerization of a mixture of butadiene-1,3 and styrene in the presence of an emulsifying agent, washing out substantially all of the water-soluble material present, dissolving the resulting wet, purified polymer in 1,1,2-trichloroethane, dehydrating the solution so formed by distilling out water present, chlorinating the polymer in the resulting solution, and recovering a freely soluble chlorinated product.

JOHN S. TINSLEY.
PAUL BURKE WELLDON.

REFERENCES CITED

The following references are of record in the file of this patent:

UNITED STATES PATENTS

| Number | Name | Date |
| --- | --- | --- |
| 2,292,737 | Blomer | Aug. 11, 1942 |

FOREIGN PATENTS

| Number | Country | Date |
| --- | --- | --- |
| 548,486 | Great Britain | Oct. 13, 1942 |